United States Patent [19]

Wight

[11] Patent Number: 4,963,761
[45] Date of Patent: Oct. 16, 1990

[54] WIND-DRIVEN POWER GENERATOR

[76] Inventor: C. Calvin Wight, 1496 Lakewood Ave., Lakewood, Ohio 44107

[21] Appl. No.: 304,960

[22] Filed: Feb. 1, 1989

[51] Int. Cl.$^5$ .............................................. F03D 5/00
[52] U.S. Cl. ...................................... 290/55; 415/4.2
[58] Field of Search ..................... 290/44, 55; 415/2.1, 415/4.1, 4.2, 4.4; 98/34, 42.05, 70, 78

[56] References Cited

U.S. PATENT DOCUMENTS

| | | | |
|---|---|---|---|
| 3,302,552 | 2/1967 | Walsh | 98/70 |
| 3,345,931 | 10/1967 | Walsh | 98/78 |
| 4,018,543 | 4/1977 | Carson et al. | 290/55 X |
| 4,047,834 | 9/1977 | Magoveny et al. | 290/55 X |
| 4,070,131 | 1/1978 | Yen | 290/55 X |
| 4,079,264 | 4/1978 | Cohen | 290/55 |
| 4,164,382 | 8/1979 | Mysels | 290/55 X |
| 4,275,309 | 6/1981 | Lucier | 290/55 X |
| 4,379,972 | 4/1983 | Sosa et al. | 290/55 X |
| 4,508,973 | 4/1985 | Payne | 290/55 |

Primary Examiner—A. D. Pellinen
Assistant Examiner—W. E. Duncanson, Jr.
Attorney, Agent, or Firm—Fay, Sharpe, Beall, Fagan, Minnich & McKee

[57] ABSTRACT

A wind-driven power generator comprises a substantially horizontal roof including upper and lower roof members each having a peripheral edge and a contoured pressure reducing surface. The roof members are disposed in a spaced-apart relationship with the pressure reducing surfaces facing each other and defining an air space therebetween. The distance between the pressure reducing surfaces varies from a maximum spacing at the peripheral edges of the roof members to a minimum spacing at an intermediate location of the roof members. The power generator further includes a vertical suction pipe having an upper end connected to the lower roof member in flow communication with the air space at the intermediate location of the lower roof member. The lower end of the suction pipe extends downwardly from the lower roof member. An impeller is disposed in the suction pipe at the lower end thereof and rotates when air flows horizontally through the air space. In accordance with Bernoulli effect, the increase in speed of the horizontal air flow at the intermediate location creates a pressure reduction in the air space at the upper end of the suction pipe and draws air up through the suction pipe to rotate the impeller. The impeller preferably is connected to an electrical generator that generates electricity when the impeller rotates.

13 Claims, 3 Drawing Sheets

WIND-DRIVEN POWER GENERATOR

BACKGROUND OF THE INVENTION

1. Field of the Invention

The present invention relates to a wind-driven power generator. More particularly, the invention relates to a wind-driven power generator that, by virtue of the Bernoulli effect, can efficiently produce power irrespective of the direction of the wind.

2. Description of the Related Art

The most common apparatus for converting wind energy into useful power is the windmill, which typically includes a plurality of vanes directly exposed to the wind and interconnected to rotate about a common horizontal axis. In traditional windmills, the rotational axis is permanently aligned with the prevailing wind direction. Accordingly, efficiency suffers when the wind varies from the prevailing direction.

More advanced windmills have axes that can be moved, either by servo motors or by direct reaction to the wind, into alignment with the wind. These modern windmills exhibit greater flexibility than traditional designs, but they require expensive support bearings and still suffer from important deficiencies that are inherent in windmills. For example, an electric generator directly coupled to the vane axis of a conventional windmill is exposed to outdoor elements and, therefore, is susceptible to a high rate of corrosion. In addition, access to these high-mounted generators for maintenance purposes is difficult. Furthermore, the large, rotating vanes of conventional windmills pose a significant safety hazard so that windmills must be located in areas of low population density, often on remote windmill "farms."

The present invention is intended to provide a wind-driven power generator that does not suffer from the disadvantages of conventional windmills.

For example, the present invention is intended to provide a wind-driven power generator that can efficiently generate power irrespective of the wind's direction without having to reposition the generator into alignment with the wind.

The present invention also is intended to provide a wind-driven power generator having an electrical generator that is protected from direct exposure to the corroding elements of the outdoors and affords easy access for maintenance personnel.

In addition, the present invention is intended to provide a wind-driven power generator that can be located safely in areas of high population density and that can also serve as a shelter from the weather.

Additional advantages of the present invention will be set forth in part in the description that follows, and in part will be obvious from that description or can be learned by practice of the invention. The advantages of the invention can be realized and obtained by the apparatus particularly pointed out in the appended claims.

SUMMARY OF THE INVENTION

The present invention overcomes the problems of the prior art wind-driven power generators by providing a pavilion structure having through its roof an air space in flow communication with a vertical suction pipe. The air space is shaped to produce, through the Bernoulli effect, a low-pressure area at the top of the suction pipe when the wind passes through the air space. The low-pressure area in turn produces upward air flow through the suction pipe and drives an impeller positioned in the suction pipe.

To overcome the problems of the prior art wind-driven power generators, and in accordance with the purpose of the invention, as embodied and broadly described herein, the wind-driven power generator of this invention comprises a substantially horizontal roof including upper and lower roof members each having a peripheral edge and a pressure reducing surface. The roof members are disposed in a spaced-apart relationship with the pressure reducing surfaces facing each other and defining an air space therebetween. The distance between the pressure reducing surfaces varies from a maximum spacing at the peripheral edges of the roof members to a minimum spacing at an intermediate location of the roof members. The power generator further comprises a vertical suction pipe having an upper end connected to the lower roof member and a lower end extending downwardly from the lower roof member. The upper end of the suction pipe is in flow communication with the air space at the intermediate location of the lower roof member. An impeller is disposed in the suction pipe at the lower end thereof. Air flowing horizontally through the air space creates a pressure reduction in the air space at the upper end of the suction pipe and draws air up through the suction pipe to rotate the impeller.

In the preferred embodiment of the power generator of this invention, the roof members have a substantially square shape, and the intermediate location is positioned at the centers of the roof members. Furthermore, an electrical generator preferably is connected to the impeller for generating electricity when the impeller rotates, and stationary turbine blades preferably are mounted on the inside of the suction pipe.

The accompanying drawings, which are incorporated in and which constitute a part of this specification, illustrate at least one embodiment of the invention and, together with the description, explain the principles of the invention.

DESCRIPTION OF THE PREFERRED EMBODIMENTS

Reference now will be made in detail to the presently preferred embodiments of the invention, examples of which are illustrated in the accompanying drawings.

The present invention will be described with reference to a wind-driven power generator having a pavilion structure, two embodiments of which are shown in FIGS. 1–4. The illustrated structure serves both as a shelter and as a wind-driven power generator. One possible application for the invention described herein is as one of a plurality of identical structures in a park area or picnic ground interconnected by covered walkways. The pavilions and covered walkways would serve to shelter user of the park from inclement weather. In addition, the power generating aspect of the pavilions would provide a supplemental energy source for illuminating the pavilions and walkways. As will be apparent to one of ordinary skill in the art, the present invention can be adapted to power generation from the wind in numerous other environments.

Figure 1:
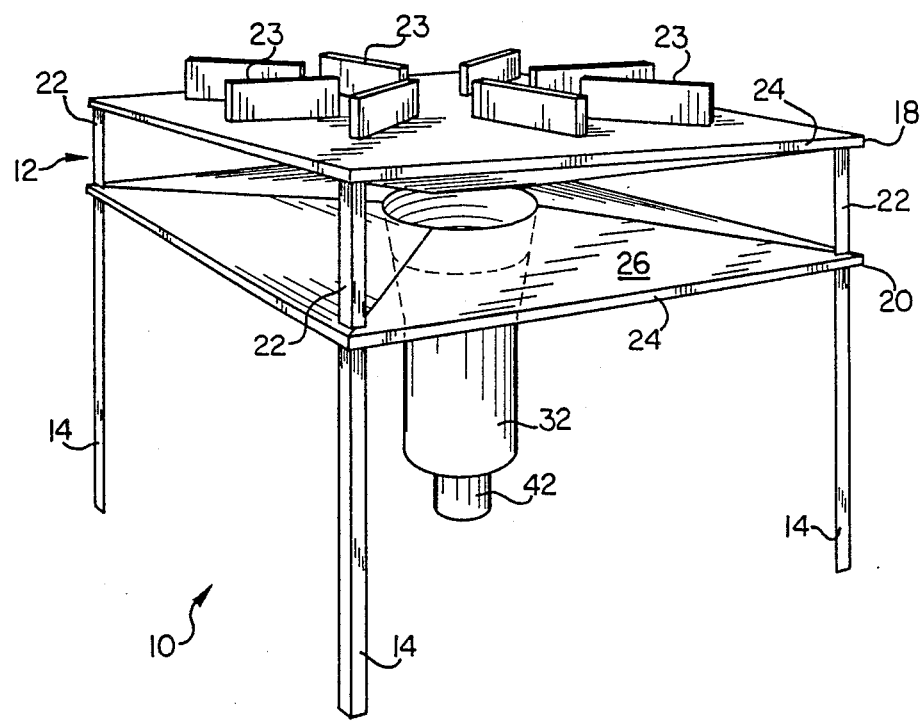
FIG. 1 is a perspective view of one embodiment of the wind-driven power generator of the present invention.
Figure 2:
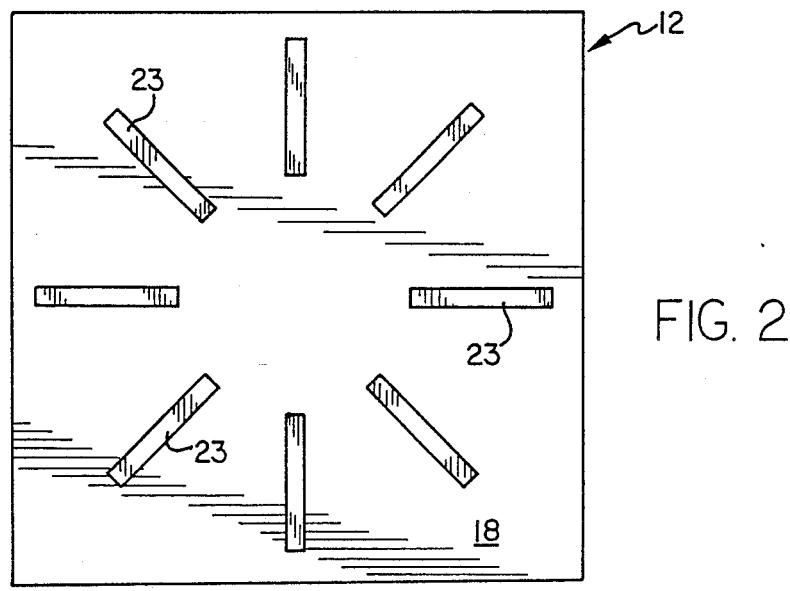
FIG. 2 is a top view of the embodiment of the present invention shown in FIG. 1.
Figure 3:
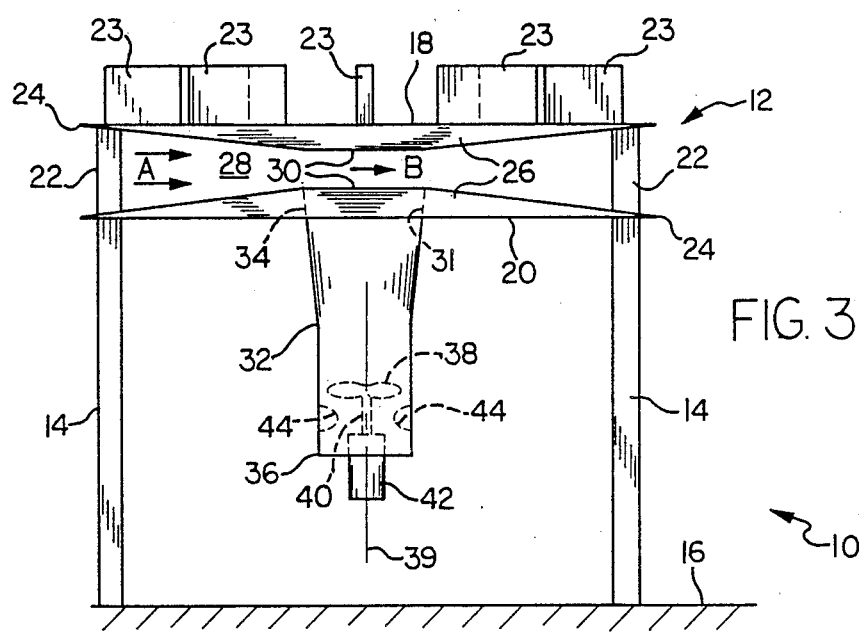
FIG. 3 is an elevational view of the embodiment of the present invention shown in FIG. 1.

The wind-driven power generator of this invention, designated generally by reference numeral 10 in FIGS. 1–3, includes substantially horizontal roof 12, which preferably has a generally square shape. The power generator of this invention also includes means for supporting the roof in an elevated position. As embodied herein and as shown in FIG. 3, the roof supporting means of this invention includes vertical roof supports 14, which support roof 12 above and substantially parallel to ground level 16. Power generator 10 preferably has four roof supports 14, one at each corner of roof 12.

In accordance with the invention, roof 12 includes upper roof member 18 and lower roof member 20, which are interconnected and spaced apart by spacers 22. In the embodiment shown in FIGS. 1–3, spacers 22 are disposed at the corners of roof members 18 and 20, in alignment with roof supports 14. Upper and lower roof members 18 and 20 preferably are disposed in a substantially parallel relation with each other. Preferably, roof 12 also includes wind barriers 23 mounted on the top surface of upper roof member 18. The function of wind barriers 23 is described below.

Each roof member 18, 20 has a substantially square peripheral edge 24 and a contoured pressure reducing surface 26. Pressure reducing surfaces 26 of upper and lower roof members 18, 20 face each other and define an air space 28 therebetween. The distance between opposed pressure reducing surfaces 26 varies from a maximum spacing at peripheral edges 24 to a minimum spacing at an intermediate location 30, which preferably is at the center of upper and lower roof members 18, 20. Lower roof member 20 has a hole 31 formed therein at intermediate location 30.

In accordance with the invention, wind-driven power generator 10 further includes vertical suction pipe 32 having upper end 34 connected to lower roof member 20. Upper end 34 is in flow communication with air space 28 through hole 31 in lower roof member 20. Lower end 36 of suction pipe 32 extends downwardly from lower roof member 20. An impeller 38 is disposed in suction pipe 32 at lower end 36. Impeller 38 preferably rotates about a vertical axis 39 and is connected via shaft 40 to electrical generator 42, which preferably extends partially out of lower end 36.

Utilization of the output of electrical generator 42 can vary depending on the nature of the prevailing winds and nature of the electrical load connected to electrical generator 42. Where prevailing winds are strong and constant, electrical generator 42 can be connected to a dedicated load independent of any power grid system. In many cases, however, the prevailing winds will not be sufficiently constant to permit reliance on power generator 10 alone to supply electric current to the load. Therefore, electrical generator 42 normally should be part of a circuit connected to an existing power grid and serve to reduce the demand on the grid when the wind blows.

The dimensions of power generator 10 can be set to fit its applicable sheltering and power output requirements. In the embodiment shown in FIGS. 1–3, roof members 18 and 20 preferably are approximately 9 m square, and lower roof member 20 is supported by roof supports 14 at a height approximately 6 m above ground level 16.

Pressure reducing surfaces 26 preferably are shallow, truncated pyramids. In the illustrated embodiment of power generator 10, the spacing between opposed pressure reducing surfaces 26 varies linearly from a maximum of about 1.5 m at peripheral edges 24 to a minimum of about 0.5 m at intermediate location 30, where suction pipe 32 communicates with air space 28.

The diameter of suction pipe 32 preferably is about 1.5 m at lower end 36 and increases to about 1.8 m at upper end 34. Suction pipe 32 preferably extends downwardly from lower roof member 20 by about 3.5 m so that lower end 36 of suction pipe 32 is approximately 2.5 m above ground level 16. These preferred dimensions provide maintenance personnel with easy access to electrical generator 42 without detracting from the headroom of those being sheltered beneath roof 12.

It will be apparent to those skilled in the art that pressure reducing surfaces 26 having different shapes, such as conical or other convex curved surfaces, also can be employed. In addition, roof members 18 and 20 can have a circular, rectangular, or other shape. Furthermore, opposed pressure reducing surfaces 26 need not have the same shape. Indeed, pressure reducing surface 26 of one of the roof members can be planar, with the constriction at intermediate location 30 being provided by the pressure reducing surface of the other roof member.

The operation of wind-driven power generator 10 now will be described with reference to FIG. 3.

When wind blows in the vicinity of the power generator 10, air entering air space 28 at peripheral edges 24 (arrows A) will have a given speed $v_A$ and pressure $p_A$. The velocity of the air at intermediate location 30 (arrow B), however, where the clearance between opposed pressure reducing surfaces 26 is at a minimum, will increase to a larger value $v_B$. Because $v_B$ is greater than $v_A$, the Bernoulli effect dictates that air pressure $p_B$ at intermediate location 30 will be less than pressure $p_A$ at peripheral edges 24.

The decrease in pressure at intermediate location 30 due to the Bernoulli effect in turn will produce a pressure differential between upper end 34 and lower end 36 of suction pipe 32, which will cause an upward flow of air through suction pipe 32. The upward air flow through suction pipe 32 rotates impeller 38 and drives electrical generator 42 through shaft 40.

Wind barriers 23 positioned on the top surface of upper roof member 18 divert into air space 28 some of the air that would normally pass over roof member 18, thereby increasing the air speed through air space 28 and increasing the pressure differential between upper end 34 and lower end 36 of suction pipe 32. Further enhancement of wind energy conversion can be obtained by employing stationary turbine blades 44 on the inside wall of suction pipe 32 to make more efficient use of the pressure differential within the suction pipe.

An important factor in the efficient operation of the power generator of this invention is the angle formed between pressure reducing surfaces 26 and the horizontal wind flow. Clearly, the steeper the angle, the greater the increase in air speed at intermediate location 30 and the greater the pressure differential between upper end 34 and lower end 36 of suction pipe 32. At some point, however, the angle will be so large that the pressure reducing surfaces will create too much of a constriction at intermediate location 30. Much of the air flow then will be diverted away from location 30, and the benefits of the Bernoulli effect will be reduced.

Figure 4:
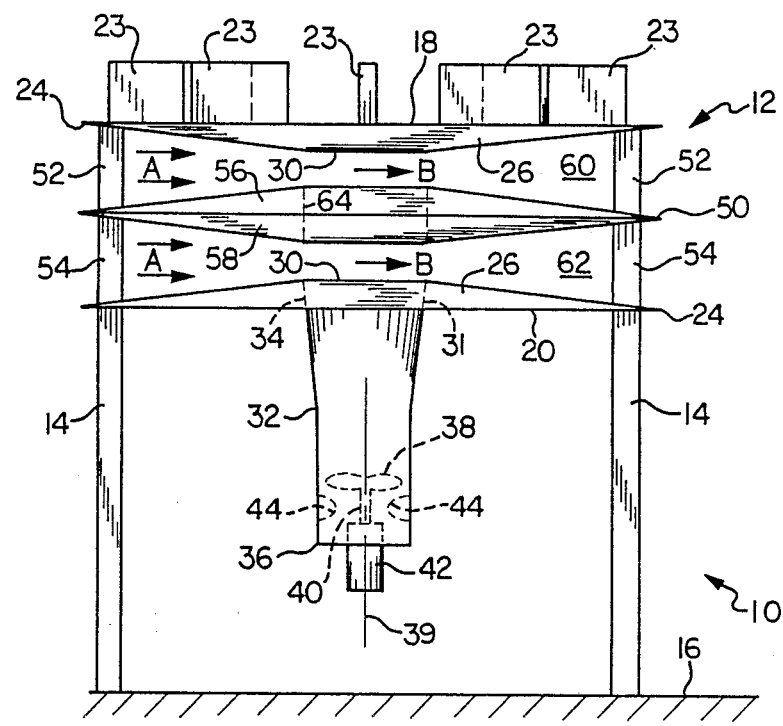
FIG. 4 is an elevational view of a second embodiment of the wind-driven power generator of the present invention.

To permit utilization of a larger wave front of air flow, a plurality of vertically stacked air spaces can be provided in the power generator, as in the second embodiment of the present invention shown in FIG. 4. In the embodiment of FIG. 4, in which elements equivalent to those of the embodiment shown in FIGS. 1-3 have the same reference numerals, roof 12 of power generator 10 includes three roof members. In this second embodiment, roof 12 includes middle roof member 50 disposed between upper roof member 18 and lower roof member 20. Roof member 50 is spaced apart from upper and lower roof members 18 and 20 by upper and lower spacers 52 and 54, respectively. As shown in FIG. 4, middle roof member 50 includes upper pressure reducing surface 56 and lower pressure reducing surface 58. Upper surface 56 faces surface 26 of upper roof member 18 and defines upper air space 60 therebetween. Lower surface 58 faces surface 26 of lower roof member 20 and defines lower air space 62 therebetween. Roof member 50 also includes hole 64 at intermediate location 30 to provide flow communication from upper air space 62 to suction pipe 32. Even if the pressure at intermediate location 30 is the same for both embodiments, the embodiment of FIG. 4 should produce greater upward air flow through suction pipe 32 because of the greater volume of space at low pressure.

Irrespective of the number of roof members employed, the advantages of the present invention over conventional windmills are numerous. The conversion efficiency of the wind-driven power generator of this invention is essentially independent of the direction of the wind without requiring expensive bearings and complex actuating mechanisms to maintain alignment with the wind direction. Furthermore, as described above, maintenance personnel have much easier access to electrical generator 42, impeller 38, and supporting bearings than they would have to the analogous components of a conventional windmill. Moreover, electrical generator 42 is sheltered from the corroding elements of the weather by roof 12 and suction pipe 32.

A significant advantage of the present invention over conventional windmills is that the pavilion structure of power generator 10 can be located in densely populated areas. In addition to the specific embodiment disclosed herein, which serves as shelter for picnickers or other park users, power generator 10 can be positioned on top of buildings in downtown urban areas, where wind energy is abundant and conventional windmills would pose a significant safety hazard.

The present invention can be used to generate power in many locations where non-generating shelters already are common. For example, the present invention could be adapted readily to the overhead shelters used at many automotive filling stations. Use at filling stations would reduce the electricity bills of the stations' operators. Moreover, as the present invention affords a form of energy production that is non-polluting, use of the present invention in filling stations might enhance the reputation of the petroleum industry among environmentalists.

The wind-driven power generator of the present invention also can be used in locations where wind speed is so high that conventional windmills are impracticable. When using the present invention in such locations, dampers can be placed within suction pipe 32 to prevent damage to impeller 38 and electrical generator 42.

Because the wind energy drives impeller 38 indirectly, through the Bernoulli effect, the wind-driven power generator of this invention also reduces some of the high bearing loads present in conventional windmills. For example, wind gusts that will strike one vane of a conventional windmill with greater force and another vane impart in eccentric load on the bearings supporting the rotating shaft. With the present invention, however, such differential loading is eliminated. In addition, by disposing impeller 38 to rotate about a vertical axis in response to an upward flow of air, the vertical thrust loads on the bearings in electrical generator 42 normally due to the weight of impeller 38 are decreased.

It will be apparent to those skilled in the art that other modifications and variations can be made in the wind-driven power generator of this invention. The invention in its broader aspect is, therefore, not limited to the specific details and illustrated examples shown and described. Accordingly, it is intended that the present invention cover such modifications and variations provided that they fall within the scope of the appended claims and their equivalents.

What is claimed is:

1. A wind-driven power generator, comprising:
   a. a substantially horizontal roof including upper and lower roof members each having a peripheral edge and a pressure reducing surface, said roof members being disposed in a spaced-apart relationship with said pressure reducing surfaces facing each other and defining an air space therebetween, the distance between said pressure reducing surfaces varying from a maximum spacing at said peripheral edges of said roof members to a minimum spacing at an intermediate location of said roof members;
   b. a vertical suction pipe having an upper end connected to said lower roof member in flow communication with said air space at said intermediate location of said lower roof member and a lower end extending downwardly from said lower roof member; and
   c. an impeller disposed in said suction pipe at said lower end thereof, said impeller rotating when air flows horizontally through said air space, the horizontal air flow creating a pressure reduction in said air space at said upper end of said suction pipe and drawing air up through said suction pipe to rotate said impeller.

2. The power generator of claim 1, further comprising means for supporting said roof in an elevated position.

3. The power generator of claim 1, wherein said impeller rotates about a vertical axis.

4. The power generator of claim 3, further comprising stationary turbine blades mounted within said suction pipe at said second end.

5. The power generator of claim 1, further comprising an electric generator connected to said impeller and generating electricity when said impeller rotates.

6. The power generator of claim 1, wherein at least one of said pressure reducing surfaces comprises a truncated pyramid.

7. The power generator of claim 1, wherein at least one of said pressure reducing surfaces comprises a convex curved surface.

8. The power generator of claim 1, wherein at least one of said pressure reducing surfaces comprises a truncated cone.

9. The power generator of claim 1, wherein at least one of said pressure reducing surfaces is substantially planar.

10. The power generator of claim 1, wherein said roof members are generally square in plan view.

11. The power generator of claim 10, wherein the centers of said roof members are aligned vertically and said intermediate location is at the centers of said roof members.

12. The power generator of claim 1, wherein said roof members are generally circular in plan view.

13. A wind-driven power generator, comprising:

a. a substantially horizontal roof including an upper roof member, a lower roof member, and a middle roof member disposed vertically between said upper and lower roof members, each of said roof members having a peripheral edge, said upper roof member having a downward-facing first pressure reducing surface, said lower roof member having an upward-facing second pressure reducing surface, said middle roof member having an upward-facing third pressure reducing surface and a downward-facing fourth pressure reducing surface, said roof members being disposed in a spaced-apart relationship with said first and third pressure reducing surfaces facing each other and defining an upper air space therebetween and said second and fourth pressure reducing surfaces facing each other and defining a lower air space therebetween, the distance between said respective facing pressure reducing surfaces varying from a maximum spacing at said peripheral edges of said roof members to a minimum spacing at an intermediate location of said roof members, each of said lower and middle roof members having a vertical hole therethrough at said intermediate location;

b. a vertical suction pipe having an upper end connected to said lower roof member at said intermediate location thereof and a lower end extending downwardly from said lower roof member, said suction pipe being in flow communication with said upper and lower air spaces through said vertical holes in said lower and middle roof members; and c. an impeller disposed in said suction pipe at said lower end thereof, said impeller rotating when air flows horizontally through said air spaces, the horizontal air flow creating a pressure reduction at said upper end of said suction pipe and drawing air up through said suction pipe to rotate said impeller.

* * * * *